INVENTORS:
HEINRICH HEIMANN, AND HARRY K. WALDES
ATTORNEY

Patented Apr. 3, 1951

2,547,263

UNITED STATES PATENT OFFICE 2,547,263

RETAINING RING

Heinrich Heimann, New York, and Harry K. Waldes, Jackson Heights, N. Y., assignors to Waldes-Koh-I-Noor, Inc., Long Island City, N. Y., a corporation of New York Application July 3, 1946, Serial No. 681,394

2 Claims. (Cl. 85—8.5)

This invention relates to improvements in retaining rings, and in particular to improved retaining rings of the so-called external type, which are adapted to provide an artificial shaft shoulder for locating machine parts, for example, bearing races, gears and the like against axial displacement relative to the shaft.

Conventional retaining rings of this type take the form of open ended spring rings having a relatively small gap between their open ends. In assembling such rings, they are spread over the end of their shaft and shifted therealong in axial direction until they reach the plane of the shaft groove provided for their reception, into which they spring seat themselves. It has also been suggested to manufacture external retaining rings as "open rings" capable of being inserted directly over the shaft in the plane of the groove, i. e., in a plane perpendicular to the axis of the shaft, but since such rings must be provided with a large gap between their free ends to enable them to be placed or assembled sidewise over the shaft, the arcuate length of the shoulder provided by such a ring is correspondingly decreased and this results in decreased gripping power. Moreover, as such "open rings" have arcuate length which does not substantially exceed 180°, it sometimes happens that they are thrown out of their groove when subjected to heavy thrust loads.

According to a more recent design, it has been proposed to form such rings in two identical parts or segments, with hooks at the free ends of each ring part. Said hooks interengage in assembly and thus lock the two parts securely to each other. A retaining ring according to this design combines the possibility of easy assembly and disassembly of the ring parts in the plane of their shaft groove with a continuous shoulder of the required adequate depth all around the periphery of the shaft and a secure locking of the two ring parts by the interengaged hooks.

However, the two-part ring as aforesaid has been designed to have a free inner diameter corresponding to the diameter of the groove bottom. It will readily be understood that, if the free diameter of the ring is the same as the diameter of the groove bottom, the ring is not capable of exerting spring pressure against the groove bottom and hence cannot pressure-seat itself in the groove, despite the fact that it is highly desirable that a retaining ring shall seat in its groove with substantial pressure fit. It is accordingly an object of this invention to provide an external retaining ring of the type made up of two ring parts or segments with interengaging hooks which are adapted to securely lock the ring parts together in assembly so that they form a continuous shaft shoulder, and which is further characterized by the fact that the so formed ring is enabled to seat itself with spring pressure against the groove bottom.

To impart the desired pressure fit to such a ring, it is necessary to construct the ring parts with a free inner diameter which is somewhat smaller than the diameter of the groove bottom. This has already been suggested for the one-piece retaining rings wherein no special problem arises in this respect. However, a quite different situation exists with a ring formed of ring parts or segments connected together by end hooks, for example, because if such ring parts are provided with hooks, without otherwise changing their form, they would not, when sprung into the groove, embrace the groove bottom along the full arcuate length of the groove semi-circle but only along smaller arcuate lengths thereof, with the result that there would remain a gap between the ends of the ring halves, preventing the hooks from interengaging. Accordingly it is a further object of this invention to provide a split or segmental type of ring wherein the arcuate length of the two parts thereof is greater than the semi-circular length of the groove bottom circle to such an extent that each ring part, when spread to seat in the groove, embraces the groove bottom throughout a full semi-circle. The hooks are then enabled to interlock with each other, and the ring, due to the spreading of its parts, will have pressure fit against the bottom of the groove throughout the full length thereof.

The measure (percentage) by which the length of the ring segments is increased as aforesaid depends on the measure by which their inner diameter is decreased relative to that of the groove bottom. If the decrease is from 1 to 2% of the groove bottom diameter, the arcuate length of the ring segments will be increased accordingly, that is to say, by 1 to 2% of the arcuate length of the groove bottom semi-circle.

A further factor requiring consideration is that of dimensioning of the ring part hooks. In order to place the second ring part after the first one has been seated, the hook of the second part has to be forced over the corresponding hook of the first part and it is obvious that it has to be spread sufficiently to clear said corresponding hook. The amount of this spreading action depends on the height of the protruding part of the hook which is approximately from 20 to 25% of the entire section height of the ring parts.

To take up the stress incident to such a substantial amount of spreading, the ring parts have to be made resilient. At the same time, however, a rather substantial section height of the ring parts is required because the groove in which the ring segments seat has to be sufficiently deep to guarantee a shoulder of adequate depth to secure the machine part, particularly a machine part of the type of ball bearing races with large chamfers or corner radii. It thus becomes apparent that the rather large section height of ring which is frequently required impairs the equally necessary resiliency of the ring without which the required substantial spreading is impossible without running into danger of the ring parts being cracked or taking on a permanent set, which latter condition would prevent proper interlocking engagement of the ring hooks.

Therefore, a further object of the invention is the provision of an external two-part retaining ring which is capable of dealing with the contradictory requirements as aforesaid. To this end, each ring part or section is provided with an arcuate recess in its middle portion, i. e. the portion thereof equi-distant from the free ends and which is of predetermined arcuate length in relation to the arcuate length of the inner semi-circle of the ring segments as to provide a spring joint which imparts sufficient resiliency to the ring parts as a whole as to permit the hooks thereof to interengage without cracking or take on a permanent set. With required resiliency provided by recessing of the ring parts, the section height thereof may accordingly be chosen as required as the section height is now independent of the amount of spreading action necessary for the interengagement of the hooks.

Appropriate tests have shown that, for a ring having conventional section height, the most favorable dimensioning of the ring part recess is that of recess length approximately one-fourth of the total arcuate length of a ring part, and a recess width (radial) of about one-half the normal ring section height. However, it is to be pointed out that these dimensions are not critical and that somewhat different recess dimensioning even though less favorable is to be embraced within the scope of the invention.

Other objects and features of the improved ring according to the invention will be apparent from the following detailed description, taken with the accompanying drawing, in which—

Figure 1:
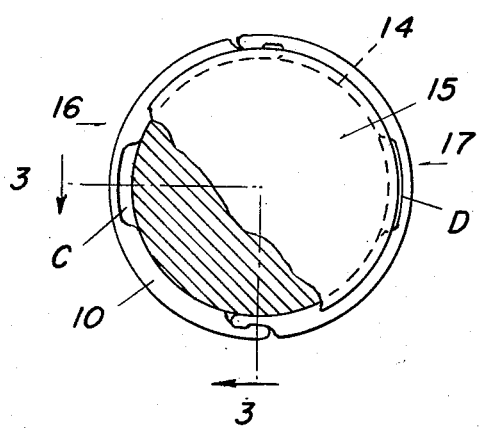
Fig. 1 is a plan view, partly in section, illustrating a two-part external retaining ring according to the invention seated in its shaft groove.
Figure 3:
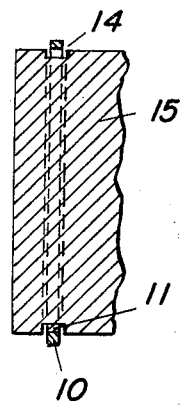
Fig. 3 is a section along line 3—3 of Fig. 1.
Figure 2:
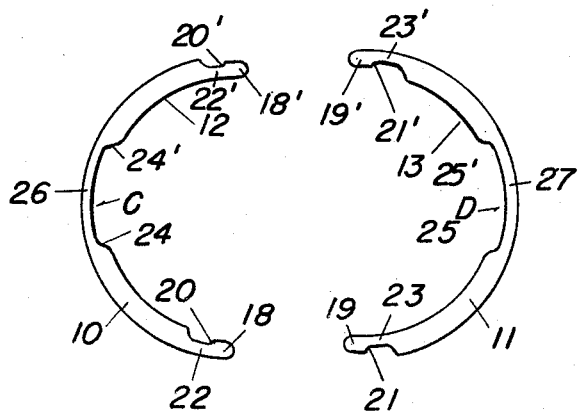
Fig. 2 is a view of the ring parts which form the ring shown in Fig. 1 in their separated relation.

A ring according to the invention comprises two identical ring parts 10 and 11 formed of spring material having inner circular edges 12 and 13, respectively, of a diameter somewhat smaller than that of the bottom of a seating groove 14 provided therefor in shaft 15. As shown, each ring part is in the form of a substantially semi-circular segment, so that when the two ring parts 10 and 11 are brought together in crosswise direction relative to the center line of shaft 15, they form a continuous or complete annulus. Upon assembly of the ring parts within the groove 14, it will be understood that they secure themselves together and provide an artificial shoulder on the shaft for locating and securing machine parts such as gears, bearing races and the like against axial displacement.

To secure the ring parts together as aforesaid, their free ends are each formed as specially shaped "hooks," as the term is herein used in its broad sense, which function in such manner that related hooks, i. e. the two upper and the two lower hooks of the parts, interengage and complement each other as said parts are brought together to form a complete annulus. According to the aforesaid special shaping, the ends of the ring part 10 are formed with reduced section height corresponding to about one-half that of the ring part proper and terminate in rounded heads 18, 18'. Rearwardly of each rounded head, the ring part is angled as at 20, 20', each angled edge forming in effect the barb of a hook, of which the adjacent head provides the hook body. It will be observed that the upper hook of the ring part 10 is directed outwardly whereas the lower hook is directed inwardly of the ring part.

The identical ring part 11 is also provided at its free end or terminal portions with rounded heads 19, 19', the section height of which corresponds to that of the rounded heads 18, 18' of the ring part 10, being substantially equal to one-half of the section height of the ring part proper. Rearwardly thereof, the ring ends are angled as at 21, 21', thus to provide hooks identical with those of the ring part 10. In the case of the ring part 11, however, the upper hook thereof is inwardly directed, whereas the lower hook is outwardly directed, this reversal of hook disposition to that of ring part 10 being simply effected by up-ending or turning the ring part 11 throughout an angle of 180° relative to ring part 10. Thus the related pairs of upper and lower hooks of the ring parts are adapted to interengage with and complement each other as the ring parts are assembled to form a complete annulus.

It will be observed that as the ring parts are forced together in the direction of the arrows 16, 17 (Fig. 1), one end portion of each ring part must be spread sufficiently as to enable the outer hook to ride radially outwardly over the coacting inner hook of the related pair thereof. Moreover, due to the fact that the inner diameter of the constituent ring parts is somewhat smaller than that of the groove bottom, this spreading action is considerable, so that special means have to be provided to prevent the ring parts upon being spread from taking on a permanent set. In this connection, it will be observed that the aforesaid spreading action is utilized to effect closing of the ring parts with a snap action, as well as to insure that the section height of the interengaged hooks is contained within the section height of the finally assembled ring. Such special means are in part provided by forming the ring part 10 with recesses disposed rearwardly of the end heads 18, 18' thereof in which seat the heads or hooks of the related ring part 11. Such recesses are formed by providing narrow neck portions 22, 22' which connect the heads 18, 18', respectively, with the ring part proper, the length and width of the neck portions being such that they define seating recesses for the heads 19, 19' of the ring part 11 and contain the latter within the section height of both ring parts proper. As the ring part 11 is identically formed, it is also provided with narrow neck portions 23, 23' connecting the heads 19, 19' with the ring part proper and which define recesses for seating the heads 18, 18' of the ring part 10. Hence, as the ring parts are brought together in assembly, the hooked ends thereof may be spread the proper amount, and thereupon they close or interengage with a snap action. It will be observed also that the special recess aforesaid assures that the hooks complement each other in the manner illustrated in Fig. 1 as to section height. In other words, the mated or interengaged hooks have a total section height which corresponds to the section height of the ring parts proper and thus the assembled ring forms a substantially smooth and effectively continuous shoulder throughout its full periphery.

In addition to the recessing of the ring parts in their end portions as aforesaid, which seeks to combine a secure locking effect of the interengaged parts with an only moderate spreading action required for their assembly, additional spreading action to provide for the inner ring diameter being smaller than the groove diameter and to avoid a permanent setting or cracking of the ring is imparted to the ring unit by providing the additional recess C in ring part 10 and a similar recess D in the ring part 11, which recesses are formed in the inner edge of the ring parts to extend between the points 24, 24' and 25, 25', respectively, on the inner circle thereof. As shown, the recesses recede from said inner circle of the ring parts in their mid portions, i. e. the portions in which the stresses are greatest when the ring is spread. It will also be observed that the recessing aforesaid results in the ring having narrow-width portions 26 and 27 in the mid portions of the ring parts. Preferably, the arcuate length of the recesses C and D is approximately one-fourth that of the ring parts, and their depth is approximately one-half that of the ring part section height, so that the narrow ring portions 26 and 27 resulting from the recessing have section height which is approximately one-half that of the normal section height of the ring parts proper.

Inasmuch as the inner recesses C and D in the mid portions of the ring parts provide the latter with the necessary resiliency, they accordingly allow a greater discretion in choosing the maximum normal section height of the ring, i. e. the section height between the recesses C and D and the hook portions of the ring parts, as compared to a two-part ring without such special recessing. Stated in other words, the resiliency of the ring depends only on the section height of the narrowed portions 26 and 27, and the present design of ring accordingly permits a much deeper shoulder than is conventional, this feature being one of advantage, especially in cases where machine parts with large chamfers or corner radii are required to be secured.

To compensate for the loss in arcuate length resulting from the required spreading of the ring parts, the arcuate or circumferential length of each part, i. e. from 18 to 18' and from 19 to 19', is made larger than that of the groove bottom semi-circle by the measure (percentage) of the decrease of inner ring diameter to groove bottom diameter. Thus, if the inner ring diameter is 1 to 2% less than that of the bottom circle of the ring groove, the length of the ring parts is 1 to 2% larger than the arcuate length of the groove bottom semi-circle. In this connection, it is to be observed that the specified percentages of increase and decrease have been found from actual ring tests to be the most appropriate.

The above described improved ring construction combines the quick assembly advantages of the known open type of retaining ring in that the ring parts can be brought together and assembled directly in the plane of the seating groove, with the substantially greater gripping power and increased thrust load resistance characterizing the prior, nearly closed rings. Moreover, the special recessing of the ring parts according to this invention imparts thereto the resiliency necessary to the spreading action required in the case of the ring parts having inner diameter which is smaller than that of the groove bottom, without cracking or taking on a permanent set.

As many changes could be made in carrying out the above construction without departing from the scope of the invention, it is intended that all matter contained in the foregoing description or shown in the accompanying drawing shall be interpreted as illustrative and not in a limiting sense.

We claim:

1. A retaining ring for preventing axial displacement of a machine part relative to a shaft provided with a ring seating groove comprising two ring parts of identical shape adapted for assembly within the groove by being forced together in a direction crosswise of the center line of the shaft, the adjacent ends of said rings parts being formed as complementary outer and inner hooks which are adapted to clear one another by relative radial movement thereof in the assembly of the ring parts and thereupon to interengage and secure the ring parts together as a complete annulus, the inner diameter of said parts being less than the diameter of the groove bottom by a predetermined amount, and the arcuate length of each ring part being correspondingly greater than that of the groove bottom semicircle, and the inner edge of each ring part having a longitudinal recess in its middle portion, the arcuate length of said recess being approximately one-fourth the arcuate length of the ring part.

2. A retaining ring as set forth in claim 1, wherein the depth of said recess is about one-half of the section height of the ring part.

HEINRICH HEIMANN.
HARRY K. WALDES.

REFERENCES CITED

The following references are of record in the file of this patent:

UNITED STATES PATENTS

| Number | Name | Date |
| --- | --- | --- |
| 1,652,272 | Dawson | Dec. 13, 1927 |
| 2,411,761 | Stolberg | Nov. 26, 1946 |
| 2,420,921 | Waldes | May 20, 1947 |

FOREIGN PATENTS

| Number | Country | Date |
| --- | --- | --- |
| 873,965 | France | July 24, 1942 |